April 15, 1930.  J. W. WICKES  1,754,870
APPARATUS FOR THE SEPARATION OF FINELY DIVIDED SOLIDS FROM LIQUIDS
Filed Feb. 4, 1926  4 Sheets-Sheet 1

Fig. I.

Inventor
J. W. Wickes

BY  ATTY.

April 15, 1930. J. W. WICKES 1,754,870
APPARATUS FOR THE SEPARATION OF FINELY DIVIDED SOLIDS FROM LIQUIDS
Filed Feb. 4, 1926 4 Sheets-Sheet 2

April 15, 1930. J. W. WICKES 1,754,870
APPARATUS FOR THE SEPARATION OF FINELY DIVIDED SOLIDS FROM LIQUIDS
Filed Feb. 4, 1926 4 Sheets-Sheet 4
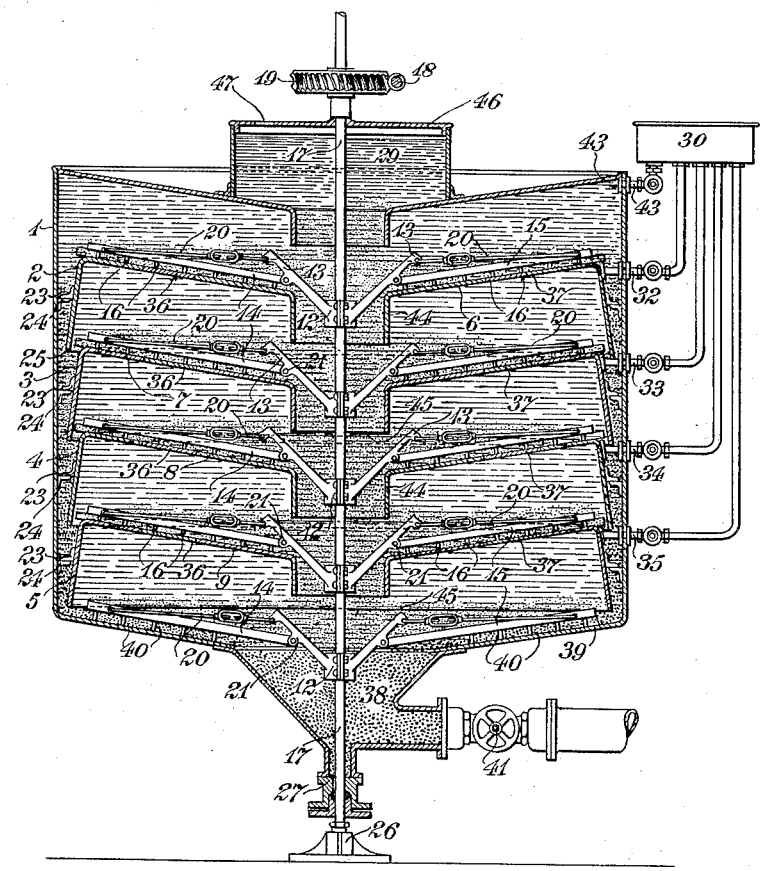

Patented Apr. 15, 1930

1,754,870

UNITED STATES PATENT OFFICE

JOHN WILFRED WICKES, OF TONGAAT, NATAL, SOUTH AFRICA

APPARATUS FOR THE SEPARATION OF FINELY-DIVIDED SOLIDS FROM LIQUIDS

Application filed February 4, 1926, Serial No. 86,001, and in Great Britain February 19, 1925.

This invention relates to a method of and apparatus for use in the separation of finely divided solids from liquids, such solids being held in suspension in the liquid, and more particularly for the separation of finely divided solids from liquids where such sediment is of varying densities and where some sediment may be of a very light flocculent nature which requires an absence of disturbing currents in the neighbourhood of the clarified liquid or overflow and where the precipitate is required to be as free as possible from entrapped liquid.

Apparatus for the separation of finely divided solids from liquids has already been proposed, the said apparatus being of such a nature that the method of clarifying the fluid consists in introducing the fluid centrally into a chamber drawing off the liquid at points radially remote from the inlet thereby causing a slow radial movement of the said fluid whereby the sediment settles and the scums rise and are removed through the central inlet, the sediment being removed in a radial direction without opposing the direction of flow of the said liquid. The apparatus proposed for carrying out such method comprises a tank containing a plurality of superposed bells the skirts of which are spaced apart and the central portion of each bell being provided with an opening so as to permit of the radial outward flow of the liquid introduced into the tank toward the wall thereof, thus producing a parallel flow of the deposited matter and of the clear liquid.

An object of the present invention is to provide an improved method of and apparatus for use in such method whereby to effect the separation of finely divided solids from liquids in a more efficient manner than heretofore, whilst minimizing the possibility of the solids and clear liquid mixing.

A further object is to provide an apparatus in which the flow of raw liquid is in a direction opposite to that of the flow of the clear liquid to zones from which the said clear liquid may be tapped to the exterior of the apparatus.

A further object of the invention is to provide means which guide and constrain the liquid in one form of the apparatus to flow vertically downward in the apparatus, the said means causing a continuous column of sediment to collect centrally of the apparatus.

Another object of the invention is to provide apparatus in which a considerable head of precipitate can be used with a comparatively small amount of sediment in storage whilst allowing for the collection of the clear liquid in the clear liquid zones and protecting such clear liquid from disturbing currents.

These and further objects hereinafter explained will be readily understood from the following description taken in conjunction with the accompanying drawings which show several constructions of apparatus in accordance with the present invention.

In order that the invention may be clearly understood and readily carried into effect reference is made to the accompanying drawings which shew diagrammatically and by way of example constructions and arrangements of apparatus in accordance with the present invention.

Figure 1 is a vertical section through an apparatus in accordance with the present invention.

Figure 2:
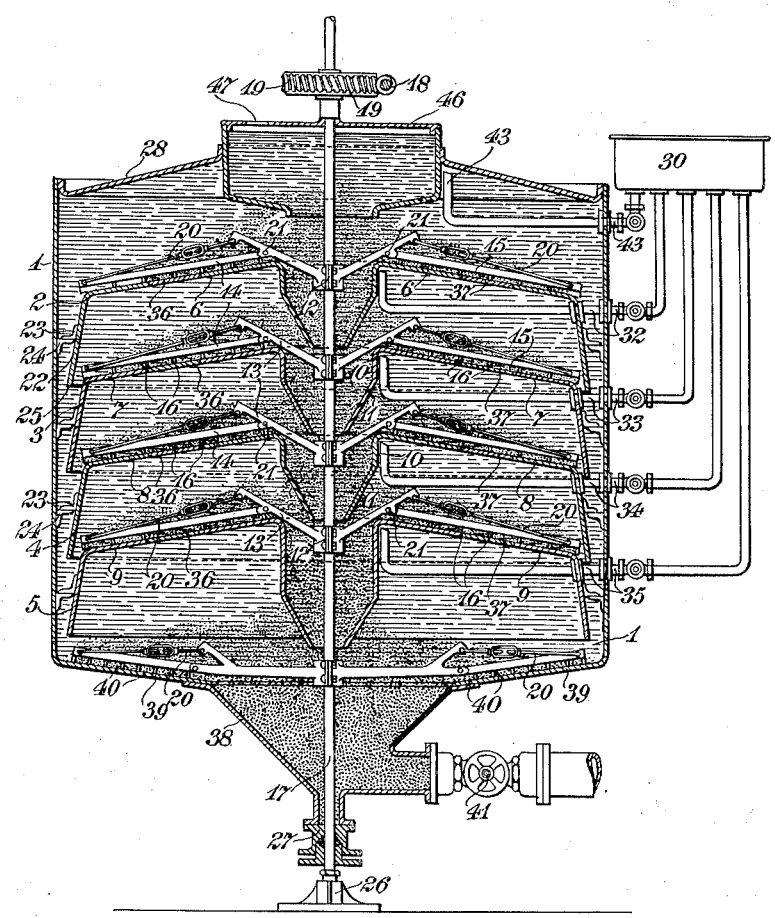
Figure 2 is a vertical section shewing a modified form of Figure 1.
Figure 3:
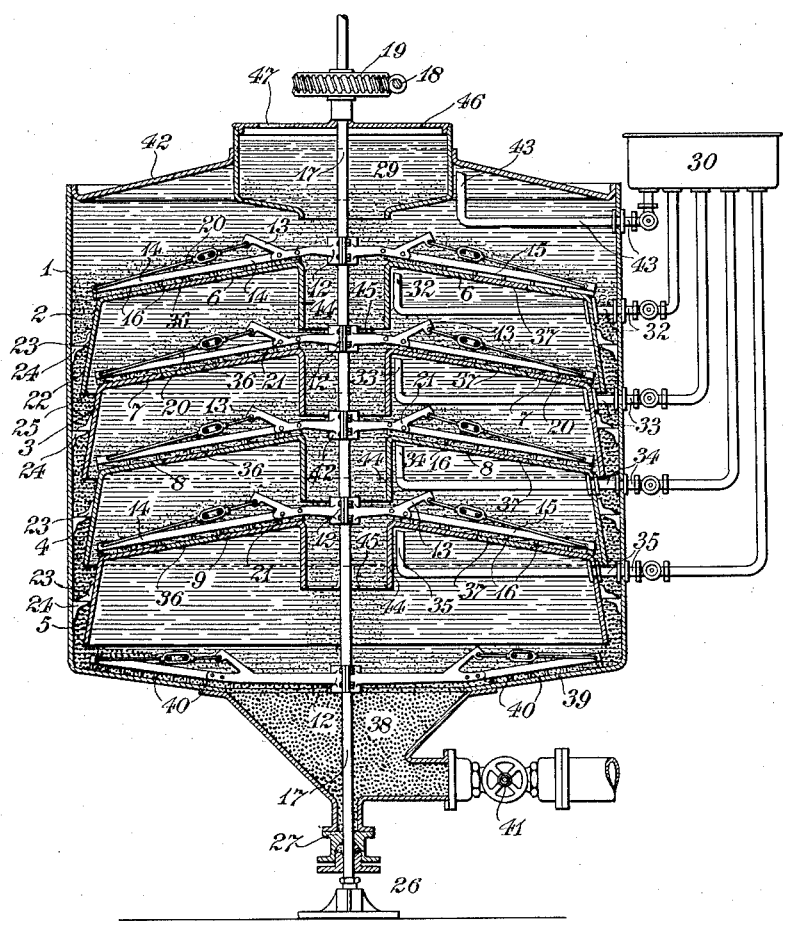

Figure 3 is a vertical section shewing a further modified form, and Figure 4 is a vertical section shewing a still further modified form of apparatus in accordance with the present invention Figure 1 shews an apparatus in accordance with the present invention wherein all clear liquid is taken from the highest zones of the bells and clear liquid may be taken from the highest zones of the bells and/or from the vat or tank or the highest zone of the said vat or tank. Although Figure 1 shews means for the removal of clear liquid from the highest zones of the bells only, the apparatus shewn in Figure 1 may be constructed in accordance with Figures 2, 3 and 4 which shew means for the removal of clear liquid from the highest zones of the bells and also from the vat or tank preferably at the highest zone of the said vat or tank. Conversely, the apparatus of Figures 2, 3 and 4 may be so constructed and the bells so arranged that clear liquid can be removed only from the highest zones of the bells, as in Figure 1.

Referring to Figure 1, 1 is a vat or tank which is provided with a number of superposed bells 1', 2, 3, 4 and 5. It should be clearly understood, however, that although 5 bells are shewn in Figure 1 any desired or suitable number of bells may be employed. The cover of the vat or tank shewn in Figure 1 is inclined upwardly towards the centre to permit of the use immediately thereunder of the bell 1' so as to allow of clear liquid being taken from the highest zones of all the bells whilst obviating if desired the removal of clear liquid from the space between the outer surfaces of the bells and the inner surface of the wall of the vat. Alternatively, the upper bell 1' may be omitted and the cover of the vat or tank may be downwardly and inwardly inclined as shewn in Figure 4. In Figure 1 the tops 6', 6, 7, 8 and 9 of the bells are dished or inclined downwardly and the several bells, which if desired may have flat tops, are provided at their centres with a downwardly extending hollow portion or boot, the upper part 10 of each hollow portion or boot being of hollow cylindrical form and the lower part 11 thereof being of hollow conical form. In each space formed by the hollow cylindrical portion 10 is a spider-shaped member 12 having arms 13 which carry bars 14, 15 to which scrapers or sweepers 16 of any suitable or well known type are secured. The spiders 12 are mounted on a shaft 17 which may be rotated by suitable gearing comprising, for example, a worm 18 and a worm wheel 19, the worm 18 being driven from any suitable prime mover. The driving mechanism and the scraping or sweeping mechanism form per se no part of the present invention. Such driving mechanism and scraping or sweeping mechanism is included in the drawing merely for the purpose of indicating that the material is scraped or swept from the tops of the bells. Each of the arms 13 is provided with an adjustable bracing member 20 for the purpose of holding the scraping or sweeping bars 14 in proper position, the said bars 14 being pivotally connected as at 21 to the arms 13 of the spider 12. The superposed bells are preferably formed with upwardly sloping sides 22 or skirts; they may, however, be of cylindrical, polygonal or other suitable form and they may converge upwardly or downwardly as desired. The bells are provided with brackets 23 or other suitable means which rest on brackets 24 suitably secured against the interior surface of the vat or tank 1. It will be seen from each of the figures of the drawings that the diameter of each bell is such, in the preferred form, as to leave a clear space between each bell and the adjacent wall of the vat. Further, the depth of each bell may be such that the lower edge of one bell projects, as shewn at 25, below the top of the bell immediately below but it should be clearly understood that if so desired the lower edge of any one bell may be disposed at any distance above the upper edge of the bell immediately below. The centrally arranged shaft 17 may be, as shewn, supported in a footstep bearing 26 so as to take up the weight of the scrapers or sweepers and the said shaft; or the said shaft may be suspended from above. The latter can be arranged to pass through a stuffing box 27 disposed above the footstep bearing 26. Adjacent to the upper end of the vat is arranged a cover 28 on which is supported a chamber 29 for receiving the raw material and feeding it to the apparatus, the said chamber being, as shewn, preferably of a considerably larger diameter than the cylindrical portion 10 of each bell. 30 is an overflow chamber for the clear liquid. 31, 32, 33, 34, 35 are conduits or pipes which connect the highest zone of the respective bell with the exterior of the apparatus. The said pipes may be connected with the overflow chamber 30. If so desired a scum-collecting trough may be provided in the top of the feed chamber which may be fed by scrapers or sweepers where conditions render this desirable and scrapers may be provided for keeping the bottom of the receiving or feed chamber clear of any heavy precipitate such as sand and other impurities. The top of each bell is preferably provided with one or more than one man-hole, two, 36, 37) shewn in the drawings) which are closed by suitable covers the upper surface of the said covers together with all the means such as rivets, bolts or equivalent for securing the said covers in position in the tops of the bells, being flush with the upper surface of the respective bell. The scrapers or sweepers 16 are designed to, but need not necessarily, over-run the outer and/or inner edges of the bells and by reason of the flush surface of the man-hole cover or covers in the tops of the said bells the upper surface of the top of each bell can be maintained in a clean condition. The pipes 31, 32, 33, 34 and 35 may be provided with valves or other means for controlling the outlet of clear liquid from the respective bells, or the said bells can be arranged with free outlets. In Figure 1 the sediment and other impurities which settle on the top of each bell are discharged by the scrapers or sweepers centrally of the said bell, that is to say, into the cylindroconical portions 10, 11 of each bell so that the said material when discharged centrally and externally of the shaft 17 forms a continuous column which ultimately arrives into a sump or conical hopper 38 suitably secured to the bottom 39 of the tank. It is preferred that the bottom 39 of the tank be downwardly inclined towards the centre of the apparatus and if so desired scrapers 40 may be provided to discharge or remove the material which has settled thereon into the sump or conical hopper 38. 41 is a valve by which the removal of the sediment from the sump or conical hopper 38 may be suitably controlled; or such removal may be effected by means of a screw conveyor or any suitable form of pump.

Before actually describing the action of the several constructions shown in the drawings accompanying the present specification it should be clearly understood that raw liquid may be introduced to the vat or tank through the opening 47 or through an opening provided in the wall of the tank or through an opening provided in the cover adjacent to the wall of the tank. As regards Figure 1 and assuming that raw liquid is introduced through the opening 47 such raw liquid if the tank be empty, strikes against the top of the uppermost bell and is deflected therefrom through the central depending annuli to the bottom of the tank or vat. Assuming, however, that the tank is partly filled with raw liquid, and that it be desired to admit further raw liquid through the opening 47, the additional raw liquid on striking the surface of the liquid already in the vat being of greater specific gravity would tend to collect towards the centre of the tank and the inwardly inclined tops of the bells would facilitate this tendency and the additional raw liquid would therefore tend to pass downwardly through the central annuli to the bottom of the tank or vat. The sweep mechanism in Figure 1 is intended to sweep the sediment towards the central depending annuli so that the raw liquid will tend to gravitate by reason of its greater specific gravity towards the bottom of the tank through the central depending annuli. As such raw liquid is more or less saturated with solids in suspension such solids therefore will tend to form a continuous column centrally through the superposed bells. If, however, the raw liquid be delivered peripherally of the vat, then the continuous column tends to form between the skirts of the bells and the wall of the tank. It should be clearly understood, however, that the sweeps of the sweeping mechanism may be inclined in such manner as to discharge the sediment from the top of the bells to the centres thereof or to the peripheral space between the skirts of the bells and the wall of the tank or vat.

Figure 2 shews an apparatus somewhat similar to the apparatus shewn in Figure 1 except that the tops of the bells in Figure 2 are dished upwardly instead of downwardly as in Figure 1; the same reference numerals, however, designate the same or similar parts. In Figure 2 the cover 28 may be dished downwardly instead of upwardly as shewn.

In Figure 2 which is a preferred form of the apparatus the raw liquid is delivered through the opening 47 and if the tank be empty the said raw liquid descends for the greater part through the central annuli, a portion, however, of the incoming raw liquid will probably strike the upper surfaces of the bells and be deflected towards the wall of the tank. If the tank be partially filled, say to a depth above the uppermost bell then the incoming raw liquid will strike the surface of the water, but being of greater specific gravity than the partially cleared liquor in the tank or vat will tend to gravitate to the bottom of the tank or vat, both through the central annuli and also through the spaces between the skirts of the bells and wall of the tank such portion of the incoming raw liquid, however, passes through the peripheral space will be a minimum in comparison to that which passes through the central annuli and consequently a more or less continuous column of the settled sediment will collect centrally of the vat, whereas a very small portion will settle down the peripheral space between the skirts of the bells and the wall of the tank. In Figure 2 the settled material is intended to be discharged from the tops of the bells outwardly thereof and towards the wall of the tank. The sweeps, however, of the sweeping mechanism may be so inclined as to effect the discharge of the settled sediment into the centre. The sediment which has settled in the truncated conical portion 38, of the tank is removed in a direction at right angles to the incoming raw liquor and through the pipes which are connected by the valve 41. Clear liquid is removed from the highest zone of the bells and/or the tank by the pipes 43, 32, 33, 34 and 35 to a receptacle 30 disposed outside of the vat.

In the modified construction shewn in Figure 3 the same or similar parts are indicated by the same reference numerals. In this construction and arrangement of bells it will be seen that the tops of the bells are dished upwardly. The impurities which settle on the tops of the bells are discharged peripherally of the bells, the impurities thus discharged forming a continuous column which finally settles by gravitational action on the bottom of the vat or tank and is discharged by the scrapers 40 into the sump or conical hopper 38 as in Figures 1 and 2. In Figures 1 and 2, however, the discharged sediment forms a central column whereas in Figures 3 and 4 the sediment discharged from the tops of the bells forms a column which is external of the outer surfaces of the bells. In Figure 1 the removal of the sediment by the scrapers is assisted by gravity down the slope of the bell top. In Figure 2 the removal of the sediment by the scrapers is against the action of gravity, such removal being effected up the bell top. The scrapers or sweepers in Figure 3 assists such gravitational action as may be present in discharging the sediment from the tops of the bells to the peripheral surface thereof, whereas in the inwardly dished type of bell top, shewn in Figure 4, the scrapers or sweepers act against gravitational action. As in Figures 1 and 2 the highest zone of each bell is connected by pipes to the exterior of the apparatus which pipes may be connected with an overflow chamber 30 as hereinbefore explained. In Figures 2, 3 and 4 a tapping of clear liquid is taken from the vat as at 43 and pipe 43, as well as from the highest zones of the bells as by the pipes 32, 33, 34 and 35. In Figure 3 the cover 42 of the vat or tank is shewn as being of the upwardly dished type, but it may be downwardly dished and a pipe is taken from the highest zone of the vat as shewn at 43 to permit of the flow of clear liquid to the exterior of the apparatus. The pipe 43 may if so desired be connected with the overflow chamber 30 as shewn. In the construction shewn in Figures 3 and 4 the bells are provided with a hollow cylindrical portion 44 or boot projecting inwardly from the centre of each bell. The lower edge 45 of the hollow cylindrical portion 44 or boot terminates slightly above the upper edge of the next lower bell. The spiders 12 in Figures 3 and 4 may be provided with one or more than one set of arms 13, 13 an adjustable bracing member such as 20 being connected to the arms 13, 13 so as to maintain the scraper or sweeper bars 14 in proper position. As hereinbefore stated the scraper and sweeper mechanism forms no part per se of the present invention.

As regards Figure 4 the construction therein shewn is the same as the construction shewn in Figure 3 except that the bell tops are dished downwardly instead of upwardly as in Figure 3. The same reference letters, however, are used for both Figures 3 and 4 and in the arrangement shewn in Figure 4 the sediment is discharged peripherally of the bells as in Figure 3, whereas Figures 1 and 2 shew a central discharge. 46 is a feed chamber cover and 47 is a hole through which raw liquid may be delivered to the apparatus. The inlet opening 47 may be preferably placed so that the feed of raw material enters below the surface of the liquid in the vat.

Obviously, the peripheral passage may be used for the delivery of raw material to the underside of the respective bell or for the passage of sediment to the bottom of the vat; or the passage formed by the central openings in the bells may be used for the delivery of raw material to the underside of the respective bell or for the passage of the sediment to the bottom of the vat or tank.

One or more than one of the downwardly extending portions or boots, whether of the partly hollow cylindrical and partly hollow conical form or of the wholly hollow cylindrical form, may be provided with means such as an Archimedean screw to maintain the inner surface of the said downwardly extending portion of the boot in a clean condition and to ensure the continuous movement of the precipitates and prevent any caking of the sediment on the inner surface of the boot.

By means of the constructions of apparatus as hereinbefore described, a continuous column of sediment may be obtained the weight of which aids in its consolidation. Further, they permit of the sediment from the various settling areas being conveyed to the bottom of the vat by passages which are separate and distinct from those through which the raw material enters the underside of a bell or the undersides of the bells, and the continuous column of sediment assists by reason of its own weight and head in the production of a heavy precipitate in the bottom sediment-receiving chamber. Apparatus in accordance with the present invention provides for a considerable head of precipitate with a comparatively small amount of sediment in storage and the use of bell-settling areas for the collection of the clear liquid gives protection in the clear liquid zones from disturbing currents. The bell-type of collector provides a quiescent zone in which the clear liquid is secured free from any disturbing currents that might be caused in the main body of the vat or tank by the incoming raw material. The bell-type of apparatus allows of the scrapers or sweepers being designed if so desired to over-run the top edges of the bells both centrally and peripherally, thereby permitting of the surfaces of the bell tops being kept clean. The amount of clear liquid abstracted from each bell may be controlled or regulated in many well known ways such as by means of valves or by adjustable weir overflows from the various supply pipes to a common receiving tank.

When the sediment is discharged centrally the velocity of entry of the raw material fed to the underside or clear-liquid zone of each bell is very low owing to the great length of the entry relatively to the area and cubic contents of the bell. This is of considerable advantage where it is desirable to have an overflow of clear liquid free from fine matter in suspension.

What I claim is:—

1. The herein described method of separating finely divided solids from liquids which consists in introducing liquid carrying solids in suspension into the upper part of a chamber, constraining the said liquid to flow vertically downward through a plurality of chambers superposed therein, withdrawing clear liquid from the highest zone of the superposed chambers, thereby causing a slow movement of the clear liquid towards the said highest zones and discharging sediment which has settled on the tops of the superposed chambers in a direction to promote the said slow movement of the clear liquid drawn from the said highest zones.

2. Apparatus for separating finely divided solids from liquids comprising an outer wall providing a chamber having an inlet at its upper end for raw liquid, an inclined cover closing the upper end of the said chamber, an outlet extending from the highest zone of the said chamber to the exterior of the said wall thereby providing for a slow movement of clear liquid to the highest zone of the said chamber, a plurality of superposed bell members in the said chamber, the said bell members being provided with means adapted to form annular chambers with the skirts of the superposed bells and means to discharge sediment from the tops of the said chamber in a direction of promote the flow of the clear liquid to the highest zones in the said bell chambers.

3. Apparatus for separating finely divided solids from liquids comprising a tank, a plurality of superposed bell members therein, and means depending centrally from the bell members to form enlarged annular chambers with the skirts of the superposed bell members.

4. Apparatus for separating finely divided solids from liquids comprising a tank, a plurality of inclined partitions superposed in the said tank, a downwardly extending flange carried by each inclined partition, means disposed centrally of each inclined partition and adapted to form enlarged annular chambers with the skirts of the superposed bells, means to discharge sediment which has settled on the tops of the inclined partitions and means to withdraw clear liquid from the highest zones formed by the combined inclined partitions and the downwardly depending flanges thereon.

5. Apparatus for separating finely divided solids from liquids comprising a tank, having an inclined cover at its upper end, means disposed adjacent to the highest zone in the said tank for the removal of clear liquid therefrom, a plurality of superposed bells disposed in the said tank, a hollow central portion depending from each bell member and forming an enlarged annular chamber with the skirt of each bell, mechanical means to remove sediment which has settled on the tops of the said bells and means to remove clear liquid from the highest zones of the said bells.

6. Apparatus for separating finely divided solids from liquids comprising a tank having an upper end closed by an inclined cover, means to withdraw clear liquid from the highest zone under the said cover, a plurality of bell members superposed in the said tank, the skirts of the said bell members thereof being spaced apart to provide passages for clear liquid to the highest zones under the bells, hollow annuli depending centrally from the bell members and adapted to form enlarged annular chambers with the skirts thereof, mechanical means to remove sediment which has settled on the tops of the bell members and means extending through the wall of the tank to the highest zones under the bells for the removal of clear liquid from the said zones to the exterior of the tank.

7. Apparatus for separating finely divided solids from liquids comprising a tank having an upper end closed by a downwardly inclined cover, means disposed under the said cover to withdraw clear liquid from the highest zone thereunder, a plurality of bell members superposed in the said tank, the skirts of the said bell members being spaced apart to provide separate passages for clear liquid to the highest zones under the said bells, annuli depending from the bell members the said annuli being of a hollow cylindrical form and disposed centrally of the tops of the bell members and providing separate passages for clear liquid to the bells, said annuli forming enlarged annular chambers with the skirts of the bells, mechancal means to remove sediment which has settled on the tops of the bell members and means extending from the highest zones under the tops of the bell members through the wall of the tank to the exterior thereof for the removal of clear liquid from the said highest zones of the bell members.

8. Apparatus for separating finely divided solids from liquids comprising a tank having its upper end closed by an inclined cover, means for the introduction of raw liquid into the said tank, means disposed under the said cover to withdraw clear liquid from the highest zone thereunder, a plurality of bell members superposed in the said tank the skirts of the said bell members being spaced apart to provide peripherally arranged passages for clear liquid to the highest zones under the tops of the said bells and for sediment to the bottom of the tank, annuli of a combined cylindrical and tapered conical form depending centrally from the said bell members to provide separate passages for clear liquid to the highest zones under the said bell members and forming enlarged annular chambers with the skirts thereof, mechanical means adapted to overlap the outer and upper edges of the bell member tops and to be rotated so as to remove sediment which has settled on the tops of the bell members to peripheral passages between the said bell members and the tank wall and means extending from the highest zones under the tops of the bell members through the wall of the tank to the exterior thereof for the removal of clear liquid from the highest zones of the bell members.

9. Apparatus for separating finely divided solids from liquids comprising a tank, a plurality of superposed bell members therein, and annuli depending centrally from the bell members to form enlarged annular chambers with the skirts of the superposed bell members.

10. Apparatus for separating finely divided solids from liquids comprising a tank, a plurality of superposed bell members therein, and hollow cylindrical annuli depending centrally from the bell members to form enlarged annular chambers with the skirts of the superposed bell members.

11. Apparatus for separating finely divided solids from liquids comprising a tank, a plurality of superposed bell members therein, and hollow conical annuli depending centrally from the bell members to form enlarged annular chambers with the skirts of the superposed bell members.

12. Apparatus for separating finely divided solids from liquids comprising a tank, a plurality of superposed bell members therein, and annuli of a combined hollow cylindrical and hollow conical contour depending centrally from the bell members to form enlarged annular chambers with the skirts of the superposed bell members.

In testimony whereof I have hereunto signed my name.

JOHN WILFRED WICKES.